(12) United States Patent
Li et al.

(10) Patent No.: US 11,757,123 B2
(45) Date of Patent: Sep. 12, 2023

(54) CAP ASSEMBLY FOR A SECONDARY BATTERY AND SECONDARY BATTERY

(71) Applicant: Contemporary Amperex Technology Co., Limited, Ningde (CN)

(72) Inventors: Quankun Li, Ningde (CN); Peng Wang, Ningde (CN); Taosheng Zhu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 250 days.

(21) Appl. No.: 15/894,789

(22) Filed: Feb. 12, 2018

(65) Prior Publication Data
US 2019/0067651 A1 Feb. 28, 2019

(30) Foreign Application Priority Data
Aug. 30, 2017 (CN) .......................... 201710765946.0

(51) Int. Cl.
*H01M 2/00* (2006.01)
*H01M 10/04* (2006.01)
(Continued)

(52) U.S. Cl.
CPC ..... *H01M 10/0413* (2013.01); *H01M 50/147* (2021.01); *H01M 50/15* (2021.01);
(Continued)

(58) Field of Classification Search
CPC ........ H01M 2/06; H01M 2/027; H01M 2/043; H01M 2/0456; H01M 2/0473;
(Continued)

(56) References Cited

U.S. PATENT DOCUMENTS 3,775,730 A * 11/1973 Rowls .................. H01M 2/305
439/521
2002/0178575 A1 12/2002 Kurosaki et al.
(Continued)

FOREIGN PATENT DOCUMENTS

CA 2317300 A1 3/2001
CN 101826603 A 9/2010
(Continued)

OTHER PUBLICATIONS

The extended European Search Report dated Sep. 23, 2019 for European Application No. 19179255.5, 12 pages.
(Continued)

*Primary Examiner* — Thanh Truc Trinh
(74) *Attorney, Agent, or Firm* — XSENSUS LLP (57) ABSTRACT

The present disclosure provides a cap assembly for a secondary battery and a secondary battery. The cap assembly includes a cap plate, an electrode terminal, a fixing member, a sealing member and a connecting member, wherein: the cap plate has an electrode lead-out hole; the fixing member is fixed to the cap plate through the connecting member; the electrode terminal includes a terminal board, wherein an outer peripheral surface of the terminal board is surrounded at least in part by the fixing member to fix the electrode terminal to the fixing member, the terminal board is located at a side of the cap plate and covers the electrode lead-out hole, and the outer peripheral surface of the terminal board protrudes out of an inner wall of the electrode lead-out hole; and the sealing member is disposed between the terminal board and the cap plate to seal the electrode lead-out hole.

11 Claims, 7 Drawing Sheets

(51) Int. Cl.
*H01M 50/15* (2021.01)
*H01M 50/147* (2021.01)
*H01M 50/545* (2021.01)
*H01M 50/342* (2021.01)
*H01M 50/193* (2021.01)
*H01M 50/176* (2021.01)
*H01M 50/55* (2021.01)
*H01M 50/184* (2021.01)

(52) U.S. Cl.
CPC ....... *H01M 50/176* (2021.01); *H01M 50/193* (2021.01); *H01M 50/3425* (2021.01); *H01M 50/545* (2021.01); *H01M 50/184* (2021.01); *H01M 50/55* (2021.01)

(58) Field of Classification Search
CPC .... H01M 2/0482; H01M 2/08; H01M 2/1241; H01M 2/30; H01M 2/305; H01M 10/0413; H01M 50/545; H01M 50/176; H01M 50/3425; H01M 50/193; H01M 50/15; H01M 50/147; H01M 50/184; H01M 50/55
See application file for complete search history.

(56) References Cited

U.S. PATENT DOCUMENTS

| | | | | |
|---|---|---|---|---|
| 2004/0137316 | A1* | 7/2004 | Streuer | H01M 2/1205 429/82 |
| 2010/0233528 | A1* | 9/2010 | Kim | H01M 10/0413 429/178 |
| 2011/0076555 | A1* | 3/2011 | Jeong | H01M 2/04 429/185 |
| 2011/0244310 | A1 | 10/2011 | Kim | |
| 2011/0287300 | A1* | 11/2011 | Byun | H01M 50/172 429/158 |
| 2013/0323574 | A1* | 12/2013 | Tsunaki | H01M 2/206 429/158 |
| 2014/0212741 | A1 | 7/2014 | Kim | |
| 2014/0212743 | A1 | 7/2014 | Kim | |
| 2014/0315056 | A1 | 10/2014 | Guen et al. | |
| 2015/0207109 | A1 | 7/2015 | Seong | |
| 2016/0293908 | A1 | 10/2016 | Lee et al. | |

FOREIGN PATENT DOCUMENTS

| | | |
|---|---|---|
| CN | 102376931 A | 3/2012 |
| CN | 101834304 B | 3/2013 |
| CN | 103427063 A | 12/2013 |
| CN | 203406360 U | 1/2014 |
| CN | 203503714 U | 3/2014 |
| CN | 203871972 U | 10/2014 |
| CN | 102544396 B | 4/2016 |
| CN | 105702889 A | 6/2016 |
| CN | 105870375 A | 8/2016 |
| CN | 205666259 U | 10/2016 |
| CN | 205985095 U | 2/2017 |
| CN | 206076296 U | 4/2017 |
| CN | 106784566 A | 5/2017 |
| CN | 206301846 U | 7/2017 |
| CN | 207233790 U | 4/2018 |
| CN | 108428823 A | 8/2018 |
| CN | 111799403 B | 8/2021 |
| EP | 2475031 A1 | 7/2012 |
| EP | 2475031 * | 11/2012 |
| EP | 2551938 A1 | 1/2013 |
| EP | 2667429 A1 | 11/2013 |
| EP | 3255699 A1 | 12/2017 |
| EP | 3451411 B1 | 10/2019 |
| EP | 3557648 B1 | 11/2020 |
| JP | 2013161692 A | 8/2013 |
| KR | 20060112743 A | 11/2006 |

OTHER PUBLICATIONS

Extended European Search report for European Application No. 18155616.8, dated May 15, 2018, 26 pages.
The First Office Action for Chinese Application No. 202010694014.3, dated Mar. 9, 2021, 14 pages.
Office Action dated Jun. 2, 2023, in corresponding Chinese patent Application No. 201710765946.0, 8 pages, with Concise Explanation of Relevance.
Contemporary Amperex Technology Co., Limited, First Office Action, CN202210514746.9, dated Mar. 2, 2023, 10 pgs.

* cited by examiner

CAP ASSEMBLY FOR A SECONDARY BATTERY AND SECONDARY BATTERY

CROSS REFERENCE TO RELATED APPLICATION

The present application is based upon and claims the benefits of Chinese Patent Application No. CN 201710765946.0 filed on Aug. 30, 2017, the entire contents of which are incorporated herein by reference.

FIELD

The present disclosure relates to the technical field of energy storage devices, and in particular, to a cap assembly for a secondary battery and a secondary battery.

BACKGROUND

New energy vehicles are widely promoted in the country and even in the world. However, in order to completely replace fuel vehicles, there are many areas for improvement. For example, there are a few problems such as low travelling mileages of vehicles, high cost of battery packs, reliability of battery packs and the like, which need to be further solved. In view of these problems, higher requirements have been proposed for a power battery as a core part of an electric vehicle, such as higher energy density, lower cost and so on.

Currently, the power battery generally has a quadrate hard-shell structure. Housing of the power battery includes a shell and a cap assembly. The housing of the power battery provides a sealed space to accommodate an electrode assembly and electrolyte. The power of the electrode assembly is directed to outside of the sealed space from inside of the sealed space through a terminal of the cap assembly. In the existing cap assembly, cap plate is a metal plate and a through hole is disposed thereon. The terminal is divided into a base portion and an extension portion, and the base portion has a cross-sectional area larger than that of the through hole. During assembly, the base portion is located below the cap plate (i.e., inside the shell). After the extension portion passes through the through hole, the extension portion is fixed by a snap spring or a rivet connection. In this way, the terminal is fixed to the cap plate. As the base portion is located inside the shell, space utilization within the shell is reduced, and as a result, the energy density of the power battery is reduced. Meanwhile, in order to seal the through hole, a sealing ring is disposed between the bottom surface of the cap plate and the base portion, so that the sealing ring will further occupy the inner space of the shell, and the energy density of the power battery is further reduced. Moreover, as it is required to provide the terminal with a base portion and a long extension portion, the terminal may not be directly press-molded, and instead, the terminal is required to be molded individually by a respective machine, so that manufacturing cost of the terminal increases.

Therefore, there is a need for a new cap assembly for a secondary battery and a secondary battery.

SUMMARY

According to an aspect of the embodiments of the present disclosure, a cap assembly for a secondary battery is provided. The cap assembly includes a cap plate, an electrode terminal, a fixing member, a sealing member and a connecting member, wherein: the cap plate has an electrode lead-out hole; the fixing member is fixed to the cap plate through the connecting member; the electrode terminal includes a terminal board, wherein an outer peripheral surface of the terminal board is surrounded at least in part by the fixing member to fix the electrode terminal to the fixing member, the terminal board is located at a side of the cap plate and covers the electrode lead-out hole, and the outer peripheral surface of the terminal board protrudes out of an inner wall of the electrode lead-out hole; and the sealing member is disposed between the terminal board and the cap plate to seal the electrode lead-out hole.

According to an aspect of the embodiments of the present disclosure, the fixing member is a hard plastic member, and a part of the fixing member is located between the cap plate and the terminal board.

According to an aspect of the embodiments of the present disclosure, the cap plate and/or the terminal board is provided with an accommodation groove surrounding the electrode lead-out hole, and the sealing member is accommodated in the accommodation groove.

According to an aspect of the embodiments of the present disclosure, the sealing member includes a body portion and an extension portion, the body portion is disposed between the terminal board and the cap plate, and the extension portion is connected with the body portion and extended into the electrode lead-out hole.

According to an aspect of the embodiments of the present disclosure, the sealing member is made of conductive rubber having a predetermined resistance value, so as to realize electrical connection between the electrode terminal and the cap plate through the sealing member.

According to an aspect of the embodiments of the present disclosure, one of the terminal board and the fixing member is provided with a convex portion, and the other is provided with a concave portion that accommodates the convex portion, and the concave portion and the convex portion are fitted with each other to fix the terminal board to the fixing member.

According to an aspect of the embodiments of the present disclosure, the convex portion is disposed on the outer peripheral surface of the terminal board, the concave portion is disposed on an inner wall of the fixing member adapted to the convex portion, and a surface of the terminal board away from the cap plate protrudes from a surface of the fixing member away from the cap plate.

According to an aspect of the embodiments of the present disclosure, the connecting member includes a nail body and a limiting portion which are connected with each other, an outer peripheral surface of the limiting portion protrudes from an outer peripheral surface of the nail body, an end of the nail body far away from the limiting portion is fixed on the cap plate, and nail body is engaged with the fixing member.

According to an aspect of the embodiments of the present disclosure, the connecting member includes a first connecting plate, a part of the first connecting plate is embedded in the fixing member and engaged with the fixing member, and another part of the first connecting plate is welded with the cap plate.

According to an aspect of the embodiments of the present disclosure, the connecting member includes a first undercut and a first undercut hole, wherein the first undercut hole is provided on a surface of the cap plate facing the fixing member, and aperture of the first undercut hole is increased along a direction from the fixing member to the cap plate, the first undercut is connected with the fixing member and is adapted to the shape of the first undercut hole, and the first undercut is accommodated in the first undercut hole.

According to an aspect of the embodiments of the present disclosure, the cap assembly further includes an anti-rotation component that are simultaneously fitted with the fixing member and the cap plate to prevent the fixing member from rotating relative to the cap plate.

According to an aspect of the embodiments of the present disclosure, the anti-rotation component includes a stopper, wherein a surface of the terminal board facing the cap plate is provided with a first groove, a surface of the cap plate facing the terminal board is provided with a second groove, and the stopper passes through the fixing member and is fitted with the first groove and the second groove respectively.

According to an aspect of the embodiments of the present disclosure, the cap assembly further includes a first insulator, wherein the first insulator includes an annular body portion that is accommodated in the electrode lead-out hole, and wherein an end face of the body portion close to the electrode terminal protrudes from a surface of the cap plate close to the electrode terminal.

According to an aspect of the embodiments of the present disclosure, the first insulator further includes an engaging portion connected to the body portion, wherein the engaging portion is located at a side of the cap plate close to the fixing member and is engaged with the cap plate.

According to an aspect of the embodiments of the present disclosure, the engaging portion has a third groove, a surface of the cap plate facing the engaging portion is provided with a protrusion in form-fitting with the third groove, and the third groove is fitted with the protrusion.

According to an aspect of the embodiments of the present disclosure, a surface of the electrode terminal facing the first insulator has a receiving groove, and an end of the first insulator close to the electrode terminal is in abutting engagement with the receiving groove to prevent the engaging portion from detaching from the cap plate.

According to an aspect of the embodiments of the present disclosure, the sealing member is in close contact with the terminal board, the fixing member, the cap plate and the first insulator at the same time.

According to an aspect of the embodiments of the present disclosure, the cap assembly further includes a lower insulator having a through hole opposite to the electrode lead-out hole, the first insulator is disposed to surround circumferential edge of the through hole, and the lower insulator is fixed to a side of the cap plate away from the fixing member through the first insulator.

According to an aspect of the embodiments of the present disclosure, a surface of the cap plate away from the fixing member is provided with a second undercut hole, aperture of the second undercut hole is decreased along a direction from the fixing member to the cap plate, the lower insulator is provided with a second undercut in form-fitting with the second undercut hole, and the second undercut is accommodated in the second undercut hole.

According to an aspect of the embodiments of the present disclosure, the electrode terminal has a plate-like structure, and a surface of the electrode terminal close to the cap plate is not exceeded the surface of the cap plate close to the electrode terminal.

According to another aspect of the embodiments of the present disclosure, a secondary battery is provided. The secondary battery includes a shell having an opening, an electrode assembly accommodated in the shell, and the above cap assembly, wherein the cap assembly covers the opening to enclose the electrode assembly in the shell.

BRIEF DESCRIPTION OF THE DRAWINGS

The present disclosure may be better understood from the following descriptions of specific embodiments of the present disclosure by taken in conjunction with the accompanying drawings, in which.

Other features, objects, and advantages of the present disclosure will become more apparent by reading the following detailed descriptions of non-limiting embodiments with reference to the accompanying drawings, in which the same or similar reference signs denote the same or similar features.

REFERENCE LABELS IN THE FIGURES

100—Cap assembly
101—Cap assembly
102—Cap assembly
103—Cap assembly
104—Cap assembly
10—Cap plate
11—Electrode lead-out hole
12—Riveting member
121—Nail body;

122—Limiting portion
13—Second groove
14—Accommodation groove
15—Liquid injection hole
16—Anti-explosion valve assembly
17—Protrusion
20—Terminal assembly
21—Terminal board
22—Fixing member
221—Through hole
222—Through hole
223—Connection hole
224—Rabbet
225—Undercut
23—Sealing member
24—Stopper
25—First connecting plate
30—Terminal assembly
31—Terminal board
31a—Receiving groove
32—Fixing member
33—Sealing member
40—Lower insulator
41—First insulator
411—Engaging portion
412—Undercut
42—Through hole
43—Second connecting plate
44—Undercut

DETAILED DESCRIPTION

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. In the drawings and the following description, at least a part of well-known structures and techniques are not shown in order to avoid unnecessarily obscuring the present disclosure. Further, for clarity, the size of a part of the structures may be exaggerated. The same reference numerals in the drawings denote the same or similar structures, and thus their detailed description will be omitted. Furthermore, the features, structures, or characteristics described below can be combined in any suitable manner in one or more embodiments.

The terms denoting directions that appear in the following description indicate directions shown in the drawings, and do not limit specific structures of the cap assembly and the secondary battery of the present disclosure. In the description of the present disclosure, it should also be noted that the terms "mounted", "connected" and "connection" should be interpreted in a broad sense unless explicitly defined and limited otherwise. For example, it may indicate "fixed connection", "disassemble connection" or "integral connection"; it may indicate a mechanical connection or an electrical connection; it may indicate a direct connection or an indirect connection. For those skilled in the art, specific meanings of the above terms in the present disclosure may be understood depending on specific situations.

The cap assembly for the secondary battery provided by an embodiment of the present disclosure is connected at an opening of a shell of the secondary battery to seal an electrode assembly and electrolyte into the shell and enable an electrical connection between the electrode assembly and conductive parts outside the shell. The cap assembly according to an embodiment of the present disclosure can reduce the space occupancy within the battery shell while ensuring the sealing effect of the battery shell. Therefore, the energy density of the secondary battery can be increased, and the reliability of the secondary battery can be ensured.

For a better understanding of the present disclosure, a cap assembly for a secondary battery according to embodiments of the present disclosure will be described in detail below with reference to FIG. 1 to FIG. 14.

Figure 1:
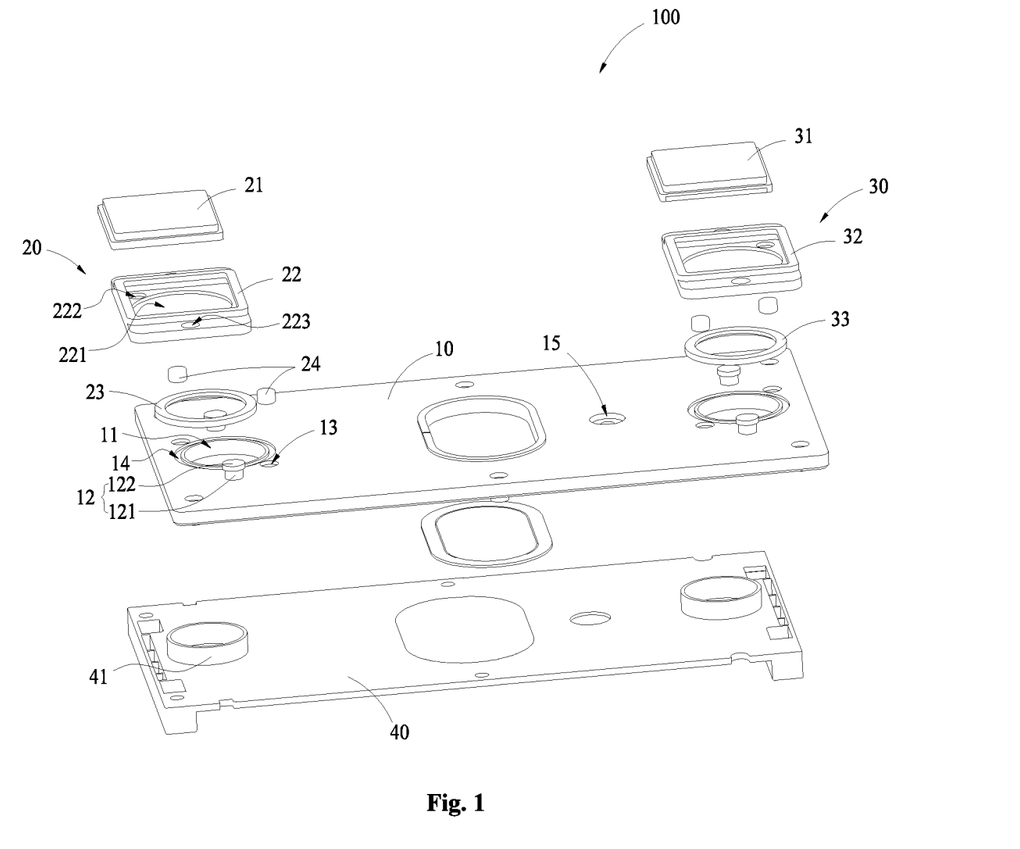
FIG. 1 is a schematic exploded diagram of a structure of a cap assembly for a secondary battery according to an embodiment of the present disclosure.
Figure 2:
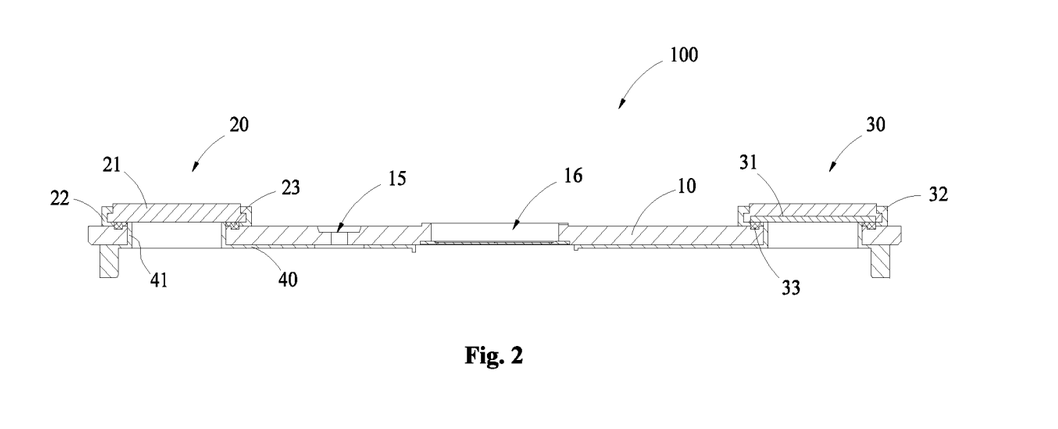
FIG. 2 is a schematic cross-sectional diagram of the structure of the cap assembly in FIG. 1 taken along longitudinal direction.

FIG. 1 is a schematic exploded diagram of a structure of a cap assembly 100 for a secondary battery according to an embodiment of the present disclosure; FIG. 2 is a schematic cross-sectional diagram of the structure of the cap assembly 100 in FIG. 1 taken along longitudinal direction. As shown in FIG. 1 and FIG. 2, the cap assembly 100 may include a cap plate 10, an electrode terminal, a fixing member 22, a sealing member 23 and a connecting member. The cap plate 10 has an electrode lead-out hole 11. The fixing member 22 is fixed to the cap plate 10 by the connecting member. The electrode terminal includes a terminal board 21 whose outer peripheral surface is at least partially surrounded by the fixing member 22 to fix the electrode terminal to the fixing member 22. The terminal board 21 is located on a side of the cap plate 10 and covers the electrode lead-out hole 11. The outer peripheral surface of the terminal board 21 protrudes from inner wall of the electrode lead-out hole 11 (i.e., as shown in FIG. 2, cross-sectional size of the terminal board 21 is larger than that of the electrode lead-out hole 11). The sealing member 23 is provided between the terminal board 21 and the cap plate 10 to seal the electrode lead-out hole 11.

Therefore, in the cap assembly 100 in the embodiments of the present disclosure, the terminal board 21 of the electrode terminal may be fixed to the cap plate 10 via the fixing member 22 provided on a side of the cap plate 10, such that the terminal board 21 covers electrode lead-out hole 11 of the cap plate 10, and the outer peripheral surface of the terminal board 21 protrudes from the inner wall of the electrode lead-out hole 11. Therefore, the electrode terminal is not required to be provided with a base portion for fixing inside the shell, that is, the space inside the shell will not be occupied, and thus the energy density of the secondary battery may be increased. In addition, since the sealing member 23 is disposed between the terminal board 21 and the cap plate 10, the terminal board 21 and the fixing member 22 also provide pressure for the sealing member 23 while being connected with the cap plate 10 so that the sealing member 23 not only does not occupy the internal space of the shell but also can be closely fitted between the terminal board 21 and the cap plate 10 to further improve the energy density and the sealing performance of the secondary battery.

According to an embodiment of the present disclosure, the secondary battery generally includes a shell (as shown in the figures), an electrode assembly (not shown) in the shell, and a cap assembly 100 covering the opening of the shell. The shell is made of a metal material and generally has a substantially cuboid shape to form a cavity for accommodating the electrode assembly The electrode assembly is placed in the cavity of the shell together with the electrolyte and the electrode assembly is formed by spirally winding or sequentially stacking a positive electrode plate, a negative electrode plate and a separator. The separator is an insulator between the positive electrode plate and the negative electrode plate.

According to an embodiment of the present disclosure, the cap assembly 100 generally includes a cap plate 10, a terminal assembly 20, a terminal assembly 30, and a lower insulator 40. The cap plate 10 is in the shape of a thin plate and has a size and shape matched with the opening of the shell so as to be capable of being connected at the opening of the shell. The cap plate 10 is made of a metal material, for example, the same metal material as that of the shell. In the embodiment, the cap plate 10 is provided with the electrode lead-out hole 11, a riveting member 12, a second groove 13, an accommodation groove 14, a liquid injection hole 15 and an anti-explosion valve assembly 16.

The liquid injection hole 15 is formed on the cap plate 10 in a predetermined size, so that the electrolyte can be injected into the shell through the liquid injection hole 13 after the cap plate 10 covers the opening of the shell and is hermetically connected with the shell.

The anti-explosion valve assembly 16 may have a conventional structure (for example, by providing a rupture disc) and may be disposed at a substantially central position of the cap plate 10. When the gas pressure inside the secondary battery becomes too large as a result of overcharging, over-discharging, or over-heating of the secondary battery, the rupture disc in the anti-explosion valve assembly 164 may be broken so that the gas produced inside the secondary battery may be exhausted to the outside via a through hole of the anti-explosion valve assembly 16, thereby being able to prevent the secondary battery from exploding.

The cap plate 10 is provided with two electrode lead-out holes 11 which are respectively used for a wiring board (not shown in the figure) inside the shell to enable electrical connection between an electrode terminal in a positive terminal assembly and an electrode terminal in a negative terminal assembly and the positive electrode plate and the negative electrode plate inside the shell. One of the terminal assembly 20 and the terminal assembly 30 is a positive terminal assembly and the other is a negative terminal assembly. As shown in FIG. 1 and FIG. 2, the terminal assembly 20 generally includes an electrode terminal, a fixing member 22 and a sealing member 23. The electrode terminal includes the terminal board 21, and preferably, the electrode terminal is consist of the terminal board 21. Similarly, the terminal assembly 30 generally includes an electrode terminal, a fixing member 32, and a sealing ring 33. The electrode terminal includes a terminal board 31, and preferably, the electrode terminal is consist of the terminal board 31. Since the structure of the terminal assembly 20 and its mounting on the cap plate 10 are similar to those of the terminal assembly 30 in this embodiment, only the structure of the terminal assembly 20 and its mounting on the cap plate 10 are described as an example.

With continued reference to FIG. 1 and FIG. 2, the terminal assembly 20 is a positive terminal assembly, for example. In the present embodiment, the terminal board 21 has a square sheet or plate structure and is fixed to the fixing member 22 in such a way that its outer peripheral surface is at least partially surrounded by the fixing member 22. Then the terminal board 21 is fixed onto the cap plate 10 through the fixing member 22. In an example, the terminal board 21 and the fixing member 22 may be engaged by an integral injection molding process. In an optional embodiment, the entire outer peripheral surface of the terminal board 21 is surrounded by the fixing member 22 so as to increase the connection strength therebetween.

Specifically, the fixing member 22 has an accommodation space 223 adapted to the shape of the terminal board, so as to contain the terminal board in the accommodation space and be affixed to the terminal board 21. In this way, a part of the fixing member 22 is clamped between the terminal board 21 and the cap plate 10. In order to increase the fastening force for bonding the terminal board 21 and the fixing member 22 to each other, an annular convex portion is provided on the outer peripheral surface of the terminal board 21. Correspondingly, an annular concave portion for accommodating the annular convex portion is provided on an inner wall of the fixed member 22 being affixed to the terminal board 21. When the terminal board 21 is placed in the accommodation space of the fixing member 22, the annular convex portion and the annular concave portion form an engaging structure with each other so that the terminal board 21 can be firmly connected in the fixing member 22. Alternatively, an accommodation space adapted to the shape of the terminal board 21 may also be formed between the fixing member 22 and the cap plate 10 for accommodating the terminal board 21 (in this case, the fixing member 22 does not have a portion clamped between the terminal board 21 and the cap plate 10). Of course, the fixing as mentioned herein means that the terminal board 21 may not have movements in the thickness direction relative to the fixing member 22.

After the terminal board 21 and the fixing member 22 are connected to each other, the terminal board 21 covers the electrode lead-out hole 11 and the outer peripheral surface of the terminal board 21 protrudes from the inner wall of the electrode lead-out hole 11 (that is, as shown in FIG. 2, the cross-sectional dimension of the terminal board 21 is larger than that of the electrode lead-out hole 11). Also, the surface of the terminal board 21 away from the cap plate 10 protrudes from the surface of the fixing member 22 away from the cap plate 10 (that is, as shown in FIG. 2, the upper surface of the terminal board 21 is higher than that of the fixing member 22). Meanwhile, a through hole 221 is disposed on a side of the fixing member 22 close to the cap plate 10 so that the terminal board 21 can be exposed out of the inside of the shell through the through hole 221 and thus be electrically connected with the positive electrode plate of the electrode assembly.

Since the electrode terminal is connected to a busbar (not shown in the figure) through the surface of the terminal board 21 far from the cap plate 10, contact area between the electrode terminal and the busbar can be increased when a plurality of secondary batteries are connected in series or in parallel. Therefore, it is possible to improve the overcurrent capability of the electrode terminal. And since the outer peripheral surface of the terminal board 21 protrudes from the inner wall of the electrode lead-out hole 11, the terminal assembly 20 is required to be assembled from the top to the bottom when it is assembled. Thus the terminal board 21 can be fixed only by the fixing member 22 without an additional fixing structure provided on the terminal board 21 itself, and then the structure of the electrode terminal can be simplified. Preferably, the electrode terminal has a plate-like structure and the surface of the electrode terminal close to the cap plate 10 is not exceeded the surface of the cap plate 10 close to the electrode terminal (i.e., the electrode terminal is composed of the terminal board 21, and the electrode terminal is not stretched into the electrode lead-out hole 11). Compared with the conventional terminal structure of the cap plate for the secondary battery, the electrode terminal with the plate structure in an embodiment of the present disclosure can be processed in batch by blanking, thus production efficiency can be increased and production cost can be reduced. The space inside the shell will not be occupied, and thus the energy density of the secondary battery can be increased effectively.

As a variant of the above-described embodiment, the engagement between the terminal board 21 and the fixing member 22 can be realized by an annular concave portion provided on the outer peripheral surface of the terminal board 21 and an annular convex portion provided correspondingly on the inner wall of the fixing member 22 which are fitted with each other.

With continued reference to FIG. 1 and FIG. 2, the sealing member 23 is disposed between the terminal board 21 and the cap plate 10, and the sealing member 23 surrounds the electrode lead-out hole 11. In this embodiment, specifically, the sealing member 23 has an annular shape, and the surface of the sealing member 23 facing the cap plate 10 is formed in a step-structure. That is, the surface of the sealing member 23 facing the cap plate 10 is provided with an annular protrusion. The cap plate 10 is provided with an annular accommodation groove 14 which is surrounded the electrode lead-out hole 11. The annular protrusion of the sealing member 23 may be fitted in the accommodation groove 14 to position the sealing member 23 by the accommodation groove 14, so as to prevent the sealing member 23 from moving between the terminal board 21 and the cap plate 10. Of course, the accommodation groove 14 may also be disposed on the surface of the terminal board 21 facing the cap plate 10, and the sealing member 23 can also be positioned by providing the accommodation groove 14 on the terminal board 21.

In this embodiment, the sealing member 23 is in close contact with the terminal board 21, the fixing member 22 and the cap plate 10 at the same time. Therefore, the sealing member 23 may be evenly pressed so that the sealing member 23 may fully fill the space of the accommodation groove 14. Thus it is possible to further enhance the sealing effect of the sealing member 23. Also, as the sealing member 23 is disposed outside the shell, the contact of the sealing member 23 with the electrolyte inside the shell can be avoided so that the sealing member 23 can be prevented from swelling.

Of course, specific shape of the sealing member 23 is not limited in the embodiments of the present disclosure, and in other embodiments, the shape of the sealing member 23 may also be rectangular or other shapes. Of course, the accommodation groove 14 for the cap plate 10 is required to be in form-fitting with the sealing member 23. In addition, in some embodiments, the fixing member 22 and the sealing member 23 may also be disposed in an integral structure. Of course, in this case, it is required for the material of the fixing member 22 to have both sealing function and hardness.

In an optional embodiment, the material of the sealing member 23 may be conductive rubber having a predetermined resistance value. The sealing member 23 may be provided as conductive rubber having a predetermined resistance value, for example, the sealing member 23 may be produced using one of the following materials: conductive fluorine rubber, conductive EPDM rubber and conductive nitrile rubber. The production method may be to add a conductive material in the master batch made of the fluorine rubber, the EPDM rubber or the nitrile rubber. The conductive material may include, for example, conductive carbon fiber, conductive carbon powder, conductive ceramic, or metal powder.

Electrical connection between the terminal board 21 and the cap plate 10 can be achieved via the sealing member 23 by providing the sealing member 23 with a predetermined resistance, without providing other resistance members between the terminal board 21 and the cap plate 10. Furthermore, uniform and stable pressure may be provided to the sealing member 23 by the cap plate 10, the terminal board 21 and the fixing member 22 while ensuring the sealing performance of the electrode lead-out hole 11. Thus, the sealing member 23 is ensured to be always uniformly and stably compressed so that the contact area between the sealing member 23 and the cap plate 10 and the terminal board 21 is more stable. Therefore, when subjected to heat-expansion and cold-contraction, the engagement surfaces of the sealing member 23 with the cap plate 10 and the terminal board 21 will not be separated, so that the sealing member 23 can provide a stable resistance value between the cap plate 10 and the terminal board 21.

Of course, it is only required that the resistance value of the sealing member 23 is greater than the resistance value of the terminal board 21. Specifically, the resistance value of the sealing member 23 may be selected according to specific battery type and the material of the terminal board 21 and the cap plate 10. For example, the resistance value of the sealing member 23 may range from 1 ohm to $10^5$ ohm.

In an optional embodiment, the sealing member 23 may further include a body portion and an extension portion (not shown). The body portion is clamped between the terminal board 21 and the cap plate 10, and the extension portion is connected with the body portion and is extended into the electrode lead-out hole 11. In particular, the extension portion is annular, which abuts against the inner wall of the electrode lead-out hole 11 so as to be able to clamp between the inner wall of the electrode lead-out hole 11 and an annular outer wall of a first insulator. In this way, the sealing performance of the sealing member 23 may be further improved.

In an exemplary embodiment, the fixing member 22 is a hard plastic member. For example, the fixing member 22 may be made of a high-temperature-resistant insulating plastic material such as one or more of polyphenylene sulfide (PPS), perfluoroalkoxy resin (PFA) or polypropylene (PP) by an integral injection molding process, so that the fixing member 22 may be able to be tightly connected to the cap plate 10 while being also closely fitted with the terminal board 21.

With continued reference to FIG. 1 and FIG. 2, in an embodiment of the present disclosure, a connecting member for the fixing member 22 may include a riveting member 12 which includes a nail body 121 and a limiting portion 122. One end of the nail body 121 is connected to an upper surface of the cap plate 10 (i.e., a surface of the cap plate 10 away from the inside of the shell), and the other end of the nail body 121 is connected to the limiting portion 122. An outer peripheral surface of the limiting portion 122 protrudes out of an outer peripheral surface of the nail body 121. Two opposite sides of the fixing member 22 respectively extend outward to form extending edges, and at least one connection hole 223 is provided at each extending edge. The aperture of the connection hole 223 is adapted to the size of the nail body 121 of the riveting member 12.

In a specific implementation, the riveting member 12 may fix the fixing member 22 onto the cap plate 10 in the following ways. In a specific example, the nail body 121 may be integrally disposed on the cap plate 10. After the nail body 121 passes through the connection hole 223 provided on the fixing member 22, a force is applied at an end of the nail body 121 away from the cap plate 10 until the limiting portion 122 is formed at the end of the nail body 121 and the limiting portion 122 and the surface of the fixing member 22 away from the cap plate 10 are engaged against each other to fix the fixing member 22 onto the cap plate 10.

In another specific example, the nail body 121 and the limiting portion 122 may be formed as an integral structure. The nail body 121 is provided with a screw thread structure, and correspondingly, the cap plate 10 is provided with a screw thread hole fitted with the screw thread structure of the nail body 121. As such, after the nail body 121 passes through the connection hole 223 provided on the fixing member 22, the limiting portion 122 and the surface of the fixing member 22 away from the cap plate 10 may be engaged against each other, and the fixing member 22 may be fixed on the cap plate 10 through the fastening of the screw thread structure of the nail body 121 into the corresponding screw thread hole on the cap plate 10.

In addition, in yet another specific example, the fixing member 22 may be directly formed on the cap plate 10 having the riveting member 12 by an integral injection molding process, so that the riveting member 12 may be directly wrapped inside the fixing member 22 and engaged with the fixing member 22 so as to fix the fixing member 22 onto the cap plate 10. Moreover, the integral injection molding process may not cause any damage to the structure of the fixing member 22.

Of course, the specific structure of the fixing member 22 is not limited in the embodiments of the present disclosure. In other embodiments where the terminal board 21 is circular or in other shapes, it is only required that the accommodation space of the fixing member 22 corresponds to the shape of the terminal board 21.

As shown in FIG. 1 and FIG. 2, the lower insulator 40 is generally made of plastic material and has a substantially plate-like shape. The lower insulator 40 is attached to a surface of the cap plate 10 facing the inside of the shell so that the cap plate plate 10 are kept insulated with the electrode assembly and the wiring board provided inside the shell. The lower insulator 40 includes two through holes and first insulators 41 disposed around the through holes. The two through holes are respectively opposite to the two electrode lead-out holes 11 disposed on the cap plate 10, and the first insulators 41 are disposed to surround the circumferential edges of the through holes respectively. Description will be made for one of the two first insulators 41 below.

In this embodiment, for example, the first insulator 41 and the lower insulator 40 are disposed as an integral structure. The first insulator 41 includes an annular body portion. The size of the body portion is fitted with the electrode lead-out hole 11 so that the lower insulator 40 may be connected to the cap plate 10 by interference fitting between the body portion and the electrode lead-out hole 11 when the first insulator 41 is inserted into the electrode lead-out hole 11. An end face of the body portion of the first insulator 41 close to the electrode terminal is protruded from a surface of the cap plate 10 close to the electrode terminal so that the sealing member 23 may be closely fitted with the cap plate 10, the terminal board 21, the fixing member 22, and the body portion of the first insulator 41 while the lower insulator 40 is fixed to the cap plate 10 securely.

In an optional embodiment, the terminal assembly 20 may further include an anti-rotation component. As shown in FIG. 1 and FIG. 2, in the present embodiment, the anti-rotation component is a stopper 24. Specifically, the terminal assembly 20 may include two stoppers 24, and the two stoppers 24 are cylindrical. Two first grooves (not shown) are provided on a surface of the terminal board 21 facing the fixing member 22, and two through holes 222 are formed in the fixing member 22 adapted to the first grooves. Two second grooves 13 opposite to the through holes 222 are provided on a surface of the cap plate 10 facing the fixing member 22. The two stoppers 24 pass through the two through holes 222 of the fixing member 22 and respectively engage with two first grooves and two second grooves 13.

Thus, the terminal board 21 and the fixing member 22 may be positioned on the cap plate 10 by two fixing points formed by the two stoppers 24, so as to prevent the terminal board 21 and the fixing member 22 from moving along the surface of the cap plate 10 relative to the cap plate 10. Furthermore, it is also possible to prevent the terminal board 21 and the fixing member 22 from moving relative to each other. Thus, the anti-rotation component may also ensure stability of the engagement between the terminal board 21 and the fixing member 22 and prevent stability of the structure of the terminal assembly from being affected due to the terminal board 21 and the fixing member 22 being separated from each other. Of course, the number of the stoppers 24 is not limited to the embodiments of the present disclosure. In other embodiments, the terminal assembly 20 may also include more stoppers 24. Of course, in some embodiments, the stopper 24 and the cap plate 10 are in an integral structure, or the stopper 24 and the terminal board 21 are in an integral structure.

In addition, the specific structure of the anti-rotation component and the engagement manner between the anti-rotation component and the terminal board 21 and the cap plate 10 are not limited in the embodiments of the present disclosure. For example, in other embodiments, the anti-rotation component may further include other protrusion structures and groove structures fitted with each other that are disposed between the terminal board 21 and the fixing member 22 and between the fixing member 22 and the cap plate 10. In addition, since both the terminal board 21 and the fixing member 22 are square, it is also possible to provide the anti-rotation member correspondingly only between the fixing member 22 and the cap plate 10 so as to limit the rotation of the fixing member 22 relative to the cap plate 10.

Figure 3:
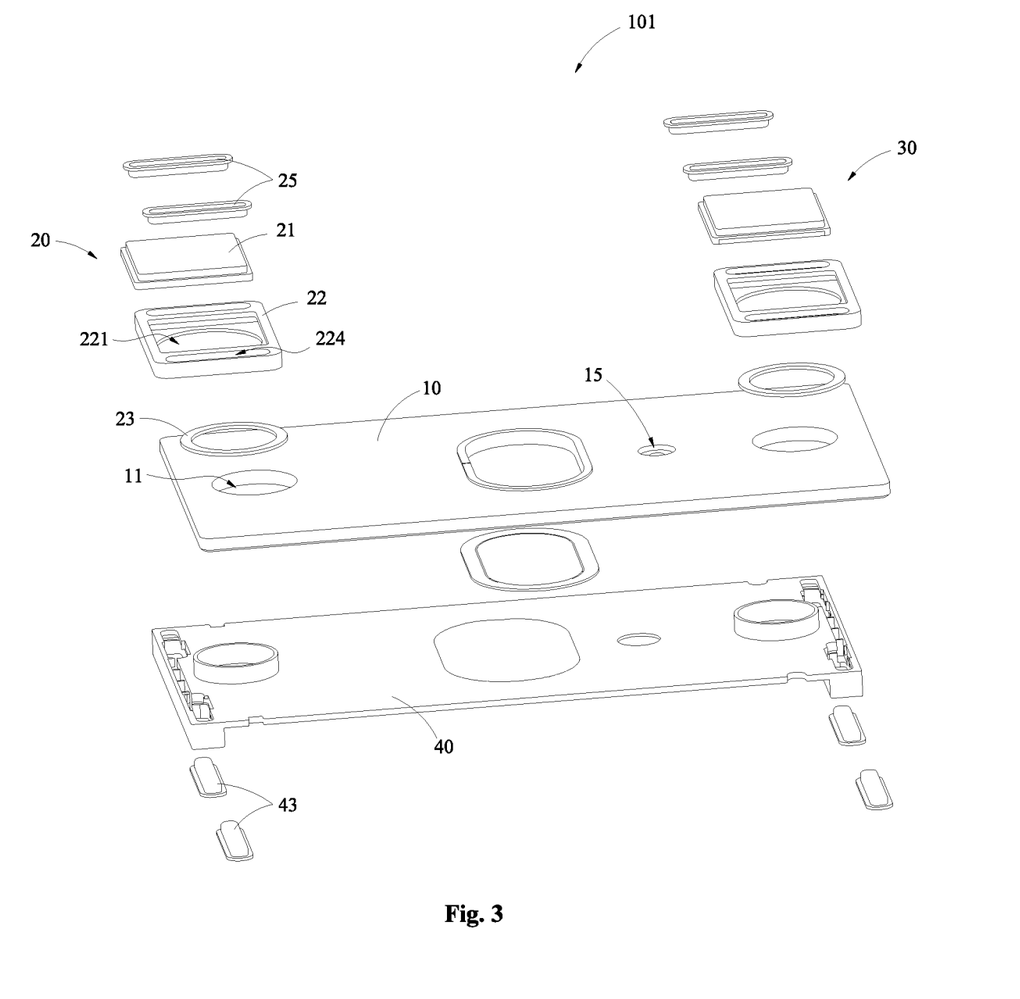
FIG. 3 is a structural exploded diagram of a structure of a cap assembly for a secondary battery according to another embodiment of the present disclosure.
Figure 4:
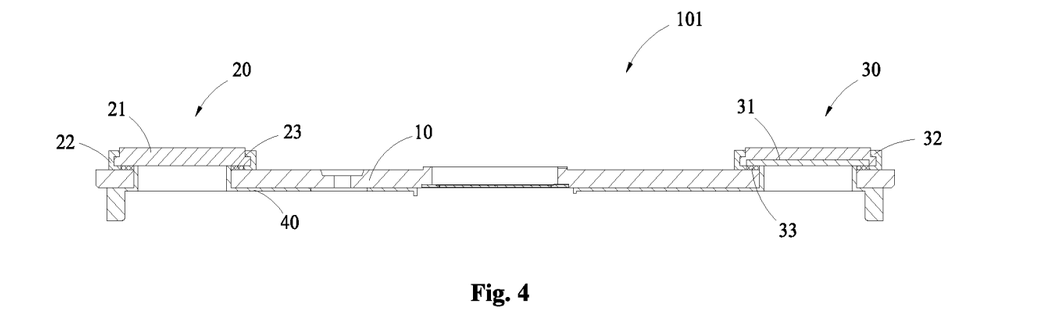
FIG. 4 is a schematic cross-sectional diagram of the structure of the cap assembly in FIG. 3 taken along longitudinal direction.

FIG. 3 is a structural exploded diagram of a structure of a cap assembly 101 for a secondary battery according to another embodiment of the present disclosure; FIG. 4 is a schematic cross-sectional diagram of the structure of the cap assembly 101 in FIG. 3 taken along longitudinal direction. As shown in FIG. 3 and FIG. 4, the structure of the cap assembly 101 in this embodiment is similar to that of the cap assembly 100 in the above embodiment. Therefore, in the present embodiment, same reference numbers are used for the same components as those in the cap assembly 100. Further, the structures and connections that have been described in the above embodiments will not be described again.

In an optional embodiment, the connecting member for fixing the fixing member 22 may further include a first connecting plate 25. Specifically, the first connecting plate 25 is made of a metal material and includes an engagement portion (not shown in the figures) and a contact portion (not shown in the figures) connected with the engagement portion. The contact portion has a prismatic structure and has a recessed portion formed on a side of the contact portion. The engagement portion is a flange connected at an edge of an opening of the recessed portion.

Each of the two opposite extending edges of the fixing member 22 is provided with a notch 224. The notch 224 is provided with a groove on two opposite sidewalls thereof along the longitudinal direction for accommodating the engagement portion of the first connecting plate 25, so that the engagement portion of the first connecting plate 25 may be inserted into the groove of the notch 224 and the contact portion of the first connecting plate 25 may be exposed out of the notch 224 and contact with the cap plate 10. Thus, the contact portion of the first connecting plate 25 may be connected to the cap plate 10 by welding, and then the fixing member 22 can be fixed to the cap plate 10 through the first connecting plate 25. By providing the recessed portion on the contact portion of the first connecting plate 25, the laminated thickness of the contact portion and the cap plate 10 can be reduced so as to facilitate the welding connection between the first connecting plate 25 and the cap plate 10. Preferably, the upper surface of the contact portion and the upper surface of the cap plate are substantially in a same level. In this case, a butt-seam welding may be adopted.

In addition, in this embodiment, for example, the lower insulator 40 may also be connected via welding to a side of the cap plate 10 facing the inside of the shell by using a second connecting plate 43. The specific manner of connecting the lower insulator 40 to the cap plate 10 through the second connecting plate 43 is the same as that of connecting via welding the fixing member 22 to the cap plate 10 through the first connecting plate 25 as above mentioned, which will not be described again.

Figure 5:
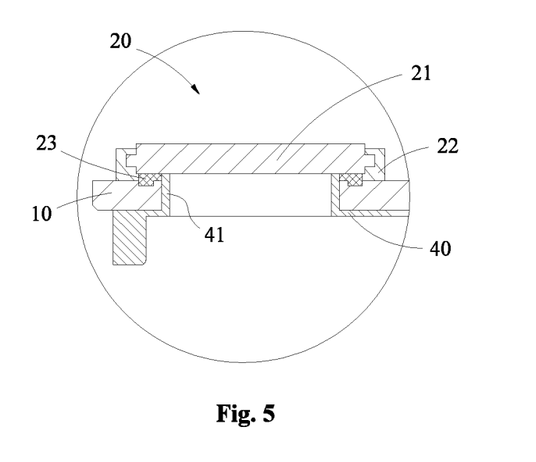
FIG. 5 is a cross-sectional partial view of a structure of a terminal assembly according to a specific example of the present disclosure.

FIG. 5 is a cross-sectional partial view of a structure of a terminal assembly 20 according to a specific example of the present disclosure. FIG. 5 only shows a partial structure of the terminal assembly 20, as the overall structure of the cap assembly in this embodiment is similar to that of the cap assembly 100 in the above embodiments. Therefore, in the present embodiment, same reference numbers are used for the same components as those in the cap assembly 100. Further, the structures and connections that have been described in the above embodiments will not be described again. In the present embodiment, it should be noted that the manner of the convex portion and the concave portion provided between the terminal board 21 and the fixing member 22 is different from that in the above embodiments. In the present embodiment, the convex portion is provided at a substantially center position of the outer peripheral surface of the terminal board 21. Similarly, the concave portion is provided at a substantially center position of the inner wall of the fixing member 22. In this way, the contact area between the terminal board 21 and the fixing member 22 can be further increased, and thus the fastening force between the terminal board 21 and the fixing member 22 can be increased.

Figure 6:
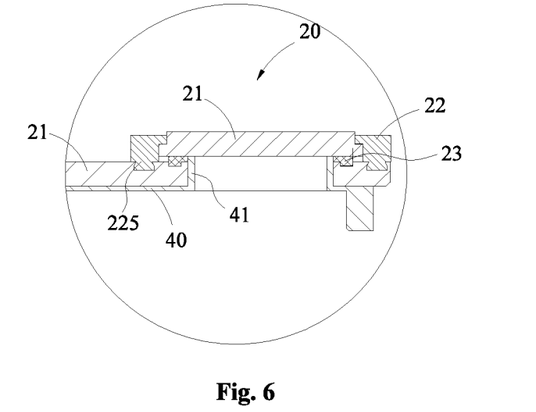
FIG. 6 is a cross-sectional partial view of a structure of a terminal assembly according to another specific example of the present disclosure.

FIG. 6 is a cross-sectional partial view of a structure of a terminal assembly 20 according to another specific example of the present disclosure. FIG. 6 only shows a partial structure of the terminal assembly 20, as the overall structure of the cap assembly in this embodiment is similar to that of the cap assembly 100 in the above embodiments. Therefore, in the present embodiment, same reference numbers are used for the same components as those in the cap assembly 100. Further, the structures and connections that have been described in the above embodiments will not be described again.

In the present embodiment, the connecting member may be an undercut 225 (i.e., a first undercut) integrally formed on the fixing member 22. Correspondingly, an undercut hole (i.e., a first undercut hole, not shown in the figure) adapted to the undercut 225 is provided on the cap plate 10. Specifically, a plurality of undercut holes may be disposed around the electrode lead-out hole 11. The aperture of the undercut hole increases along the direction from the fixing member 22 to the cap plate 10. That is to say, the aperture of the undercut hole gradually decreases along the direction from the bottom to the opening of the undercut hole. Correspondingly, a surface of the fixing member 22 facing the cap plate 10 is provided with the undercut 225 adapted to the shape of the undercut hole. Thus, the fixing member 22 can be fixed to the cap plate 10 by the engagement between the undercut 225 provided on the fixing member 22 and the undercut hole provided on the cap plate 10. Of course, the increasing of the aperture of the undercut hole mentioned herein does not require that the aperture of the undercut hole regularly increases along the direction from the fixing member 22 to the cap plate 10, but means that the aperture of one end of the undercut hole far away from the fixing member 22 is larger than that of the other end of the undercut hole close to the fixing member 22. In other words, it is only required that the aperture of the bottom of the undercut hole is larger than the aperture of the top of the undercut hole so as to allow for the engagement between the undercut and the undercut hole.

Figure 7:
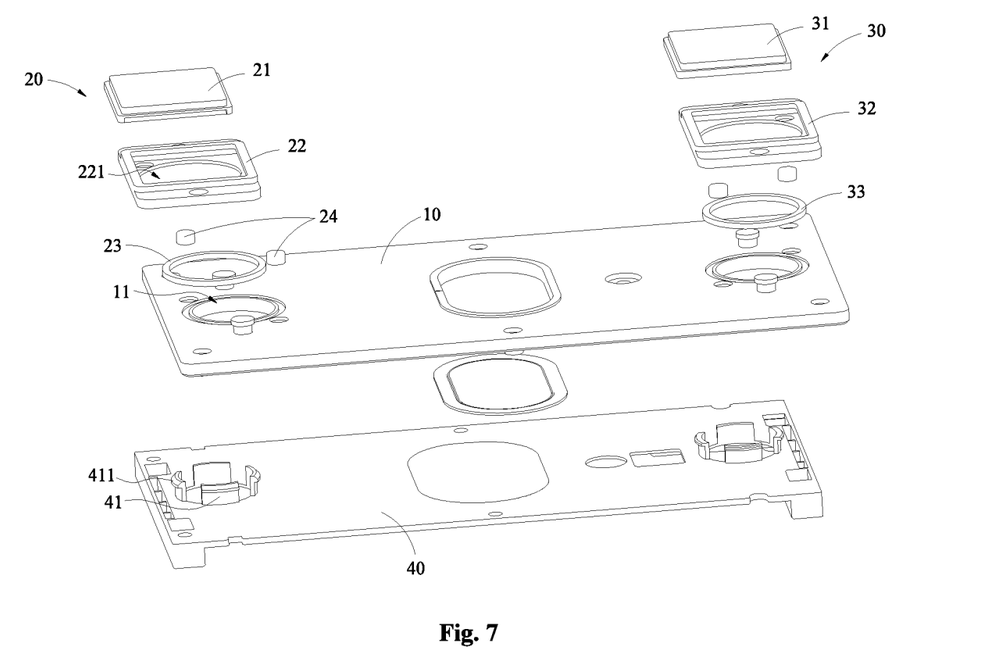
FIG. 7 is a schematic exploded diagram of a structure of a cap assembly for a secondary battery according to yet another embodiment of the present disclosure.
Figure 8:
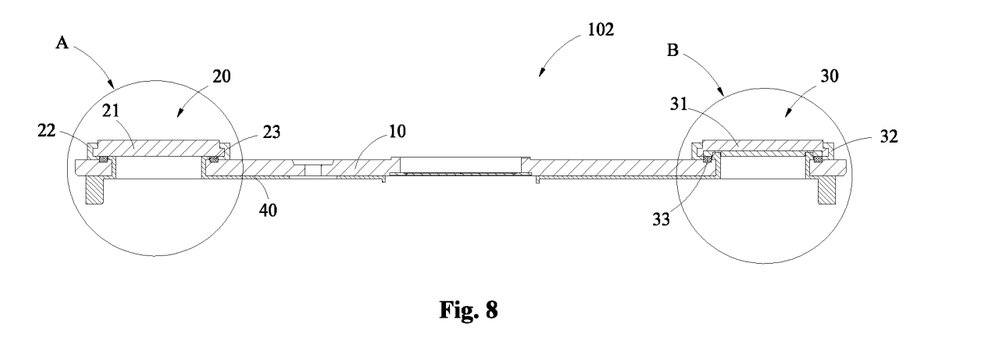
FIG. 8 is a schematic cross-sectional diagram of the structure of the cap assembly in FIG. 7 taken along longitudinal direction.
Figure 9:
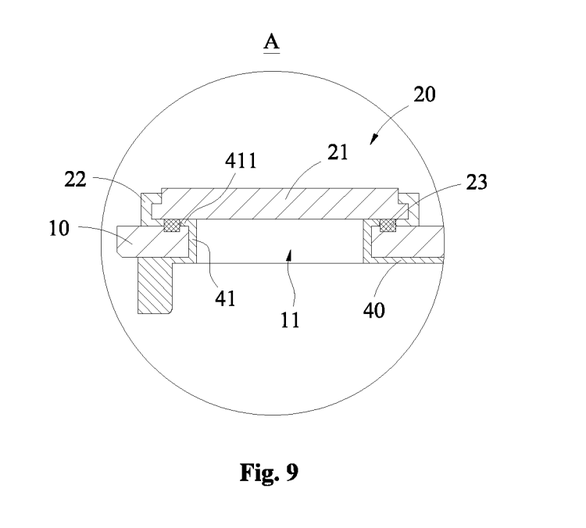
FIG. 9 is an enlarged partial view of a portion A of FIG. 8.
Figure 10:
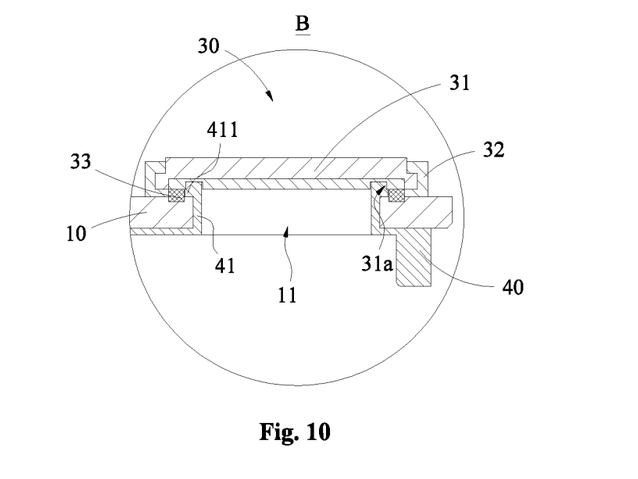
FIG. 10 is an enlarged partial view of a portion B of FIG. 8.

FIG. 7 is a schematic exploded diagram of a structure of a cap assembly 102 for a secondary battery according to yet another embodiment of the present disclosure. FIG. 8 is a schematic cross-sectional diagram of the structure of the cap assembly 102 in FIG. 7 taken along longitudinal direction. FIG. 9 is an enlarged partial view of a portion A of FIG. 8. FIG. 10 is an enlarged partial view of a portion B of FIG. 8. As the overall structure of the cap assembly 102 in this embodiment is similar to that of the cap assembly 100 in the above embodiments, in the present embodiment, same reference numbers are used for the same components as those in the cap assembly 100. Further, the structures and connections that have been described in the above embodiments will not be described again. The difference between this embodiment and the above embodiments is that the first insulator 41 is divided into a plurality of portions, and the first insulator 41 further includes an engaging portion 411 connected to the body portion thereof.

As shown in FIG. 7, in order to facilitate the fitting between the engaging portion 411 and the cap plate 10, the first insulator 41 is divided into a plurality of sheet structures on the basis of the cap assembly 100 in the above embodiment. That is, the first insulator 41 is intermittently formed on the edge of the electrode lead-out hole 11, and the plurality of sheet structures are spaced apart from each other by a certain distance. The engaging portion 411 is disposed on an edge of the body portion of the first insulator 41 close to the electrode terminal and protrudes outward radially so as to respectively form a flange on the periphery of the plurality of sheet structures of the first insulator 41. Further, the engaging portion 411 protrudes from the inner wall of the electrode lead-out hole 11.

As shown in FIG. 9, correspondingly, an annular groove which is in form-fitting with the engaging portion 411 is formed around the electrode extraction hole 11 between the terminal board 21 and the cap plate 10. As such, when the body portion of the first insulator 41 is gradually extended into the electrode lead-out hole 11, as the first insulator 41 has certain elasticity and there are gaps among the plurality of sheet structures of the first insulator 41, the first insulator 41 can be compressed in the electrode lead-out hole 11 to allow the engaging portion 411 to move against the inner wall of the electrode lead-out hole 11 toward the terminal board 21. When the engaging portion 411 reaches an annular groove formed between the terminal board 21 and the cap plate 10, the initial shape may be restored by the elastic force so as to abut the surface of the cap plate 10 close to the terminal board 21. Thus, the lower insulator 40 can be fixedly connected to the cap plate 10 through the first insulator 41. By providing the engaging portion 411, the lower insulator 40 can be firmly connected to the cap plate 10, and thus failure in insulation between the cap plate 10 and the electrode assembly inside the shell due to unstable connection between the lower insulator 40 and the cap plate 10 can be prevented. In addition, the lower insulator 40 and the first insulator 41 may also be integrally injection-molded on the surface of the cap plate 10 facing the shell.

In addition, as shown in FIG. 10, the structure of the terminal assembly 30 in the cap assembly 102 will be described as an example. In the present embodiment, a surface of the terminal board 31 facing the cap plate 10 is provided with an annular receiving groove 31a. An end of the first insulator 41 close to the terminal board 31 protrudes upwardly and can be received in the receiving groove 31a of the terminal board 31. The inner wall of the first insulator 41 and the inner wall of the receiving groove 31a of the terminal board 31 abut against each other so that the first insulator 41 will not contract inwardly. Therefore, engagement between the engaging portion 411 and the cap plate 10 can be maintained by the abutting between the receiving groove 31a of the terminal board 31 and the first insulator 41 so as to prevent the engaging portion 411 from detaching from the cap plate 10. Thus the stability of the connection between the first insulator 41 and the cap plate 10 can be increased. Of course, for the terminal assembly 20, it is also possible to provide a receiving groove on the terminal board 21 to abut with an end of the first insulator 41 close to the terminal board 21, so as to prevent the engaging portion 411 from detaching from the cap plate 10.

Figure 11:
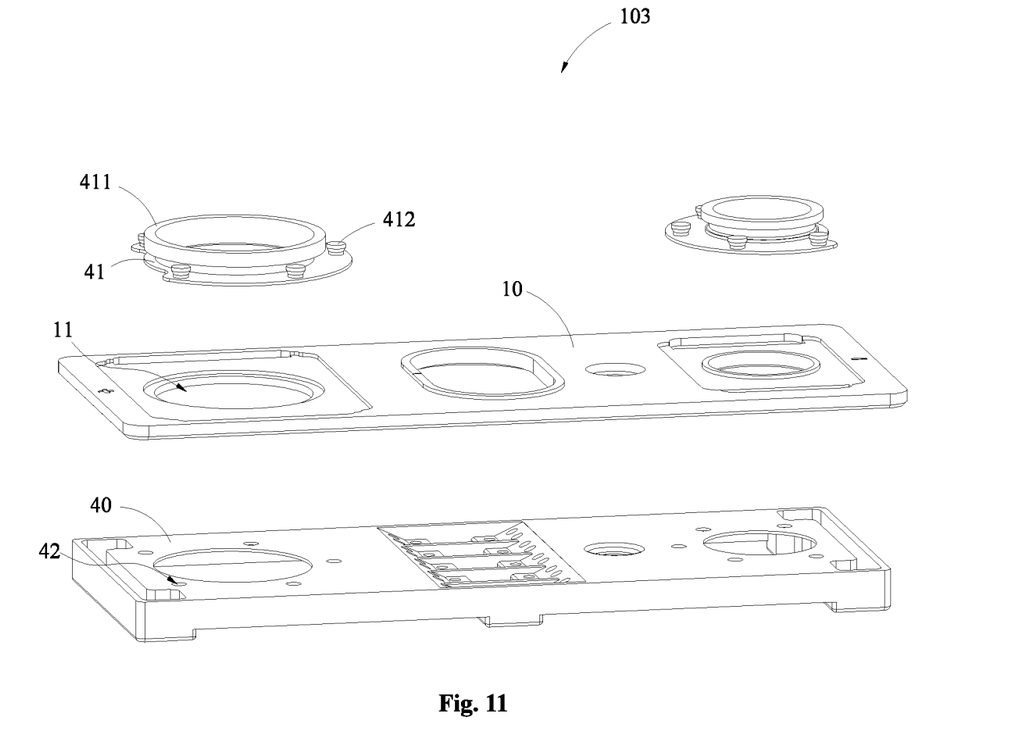
FIG. 11 is a schematic exploded diagram of a partial structure of a cap assembly for a secondary battery according to still another embodiment of the present disclosure.
Figure 12:
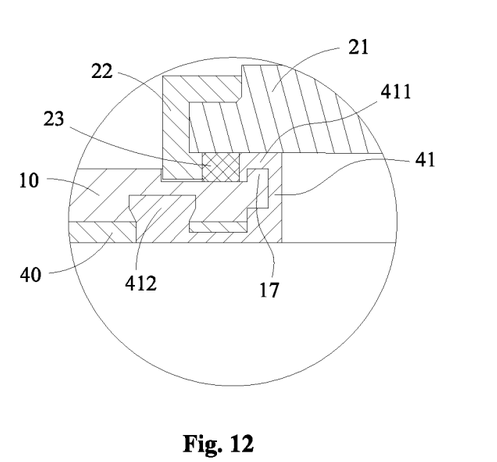
FIG. 12 is a schematic cross-sectional diagram of the structure of the cap assembly in FIG. 11 taken along longitudinal direction.

FIG. 11 is a schematic exploded diagram of a partial structure of a cap assembly 103 for a secondary battery according to still another embodiment of the present disclosure. FIG. 12 is a schematic cross-sectional diagram of the structure of the cap assembly in FIG. 11 taken along longitudinal direction. As the overall structure of the cap assembly 103 in this embodiment is similar to that of the cap assembly 100 in the above embodiments, in the present embodiment, same reference numbers are used for the same components as those in the cap assembly 100. Further, the structures and connections that have been described in the above embodiments will not be described again. The difference between this embodiment and the above embodiments is that the first insulator 41 and the lower insulator 40 in this embodiment are in a separate structure, and the lower insulator 40 is fixed to the cap plate 10 via the first insulator 41.

Specifically, as shown in FIG. 11 and FIG. 12, in the present embodiment, the body potion of the first insulator 41 extends radially outward at the side far away from the engaging portion 411 to form an extending surface. An outer circumferential edge of the extending surface is radially protruded from the edge of the electrode lead-out hole 11. A plurality of undercuts 412 (the structure is the same as that of the undercut in the above embodiments) are provided on a side of the extending surface facing the cap plate 10. The lower insulator 40 is provided with a plurality of through holes 42 fitted with the nail bodies of the undercuts 412 around the through holes opposite to the electrode extraction holes 11. Undercut holes (the structure is the same as that of the undercut hole in the above embodiments) which are in form-fitting with the undercuts 412 are provided on a surface of the cap plate 10 facing the lower insulator 40. Thus, the undercuts 412 may be engaged with the undercut holes by passing through the through holes 42 so that the lower insulator 40 may be fixed to the cap plate 10 via the first insulator 41. Of course, in this embodiment, the first insulator 41 may be formed by integral injection molding.

In addition, in this embodiment, a third groove (not shown) is further provided on a surface of the engaging portion 411 facing the cap plate 10. Correspondingly, a protrusion 17 is provided on a surface of the cap plate 10 facing the engaging portion 411 around the circumferential edge of the electrode lead-out hole 11. The shape of the protrusion 17 is fitted with the shape of the third groove. As such, the protrusion 17 on the cap plate 10 can be received through the third groove and engaged with the third groove. Therefore, the stability of the connection between the engaging portion 411 and the cap plate 10 can be further improved, and thus the detachment of the lower insulator 40 from the cap plate 10 can be prevented by preventing the engaging portion 411 from separating from the cap plate 10. Insulation failure between the cap plate 10 and the electrode assembly and the wiring board inside the shell can be avoided.

Figure 13:
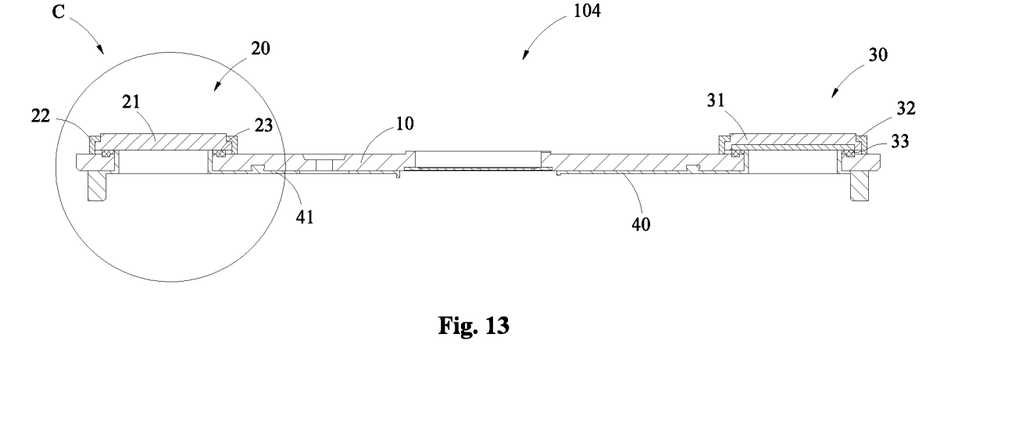
FIG. 13 is a schematic cross-sectional diagram of a structure of a cap assembly for a secondary battery taken along longitudinal direction according to further still another embodiment of the present disclosure.
Figure 14:
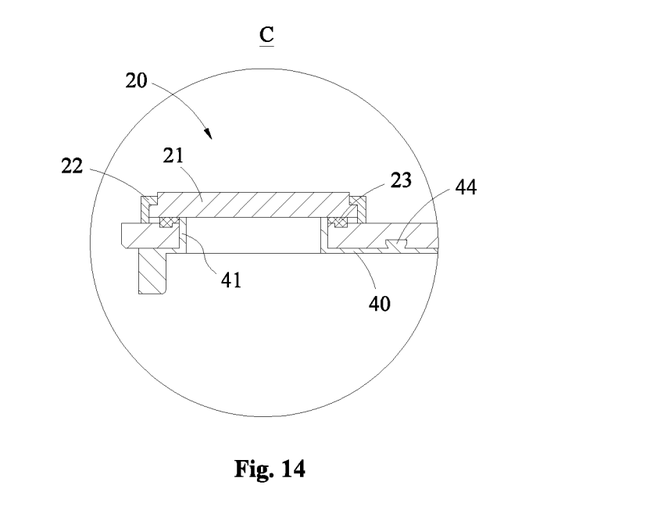
FIG. 14 is an enlarged partial view of a portion C of FIG. 13.

FIG. 13 is a schematic cross-sectional diagram of a structure of a cap assembly 104 for a secondary battery taken along longitudinal direction according to further still another embodiment of the present disclosure. FIG. 14 is an enlarged partial view of a portion C of the cap assembly 104 of FIG. 13. As shown in FIG. 13 and FIG. 14, as the overall structure of the cap assembly 104 in this embodiment is similar to that of the cap assembly 100 in the above embodiments, in the present embodiment, same reference numbers are used for the same components as those in the cap assembly 100. Further, the structures and connections that have been described in the above embodiments will not be described again.

The cover assembly 104 in this embodiment is different from the cover assembly 100 in the above embodiments in that a surface of the cap plate 10 facing the lower insulator 40 is provided with a plurality of undercut holes (the structure is the same as that of the undercut holes in the above embodiments, i.e., second undercut holes, not shown in the figure) around the electrode lead-out hole 11, and the aperture of the plurality of undercut holes decrease along the direction from the fixing member 22 to the cap plate 10. Correspondingly, a plurality of undercuts 44 (the structure is the same as that of the undercuts in the above embodiments, i.e., second undercuts) which are in form-fitting with the undercut holes of the cap plate 10 are provided on a surface of the lower insulator 40 facing the cap plate 10. In this way, the lower insulator 40 can be fixed to the cap plate 10 by the engagement between the undercuts 44 and the corresponding undercut holes on the cap plate 10.

In the above embodiments, the terminal assembly 20 and the terminal assembly 30 are mounted on the cap plate 10 in the same manner, but it is not limited to the embodiments of the present disclosure. In other embodiments, the terminal assembly 20 and the terminal assembly 30 may also be mounted on the cap plate 10 in different mounting manners.

According to an embodiment of the present disclosure, there is also provided a secondary battery (not shown in the figures). The secondary battery includes a shell having an opening, an electrode assembly accommodated in the shell, and a cap assembly for a secondary battery described in any of the above embodiments. The cap assembly covers the opening of the shell to enclose the electrode assembly in the shell. Since the secondary battery has the same advantages as that of the cap assembly in the above embodiments, it will not be redundantly described.

To sum up, with the cap assembly for the secondary battery in the above embodiments of the present disclosure, the electrode terminals may be mass-produced by arranging the electrode terminals to include the terminal board fixed to the cap plate, without having to separately produce each electrode terminal individually. Thus, the structure of the electrode terminal can be simplified and the processing cost can be reduced. Furthermore, the contact area between the external busbar and the electrode terminal can be increased to improve the overcurrent capability of the electrode terminal. The outer peripheral surface of the terminal board is disposed to protrude from the inner wall of the electrode lead-out hole and partially surround the terminal board to fasten the terminal board, so that the terminal board is fixed on the cap plate without any other fixing structure for the terminal board itself to fit with the cap plate. Thus, the internal space of the battery shell will not be occupied, and then the energy density of the secondary battery can be improved.

In addition, the sealing member is provided between the terminal board and the cap plate, so that the sealing member can be provided with pressure while the terminal board is fixed to the cap plate by the fixing member. Moreover, the terminal board, the fixing member and the sealing member are all assembled on the cap plate from top to bottom so that the sealing member is always pressed so as to ensure the sealing between the terminal board and the cap plate. At the same time, it is avoided that the sealing member, when located inside the shell, is easily contacted with the electrolyte to cause the sealing member to swell, and the occupancy of the space inside the shell is further reduced.

The fixing member and the lower insulator may be fitted with the cap plate through various fixing methods so as to not only increase the fastening force between the fixing member and the cap plate and the fastening force between the lower insulator and the cap plate but also realize connection between the fixing member and the cap plate and the connection between the lower insulator and the cap plate with simple connection structures. Furthermore, assembly process of the cap plate can be simplified, and thus production cost can be reduced.

The disclosure may be embodied in other specific forms without departing from the spirit and essential characteristics thereof. The embodiments discussed therefore should be considered in all aspects as illustrative and not restrictive. The scope of the disclosure is defined by the appended claims rather than by the foregoing description, and those modifications falling within the meaning and equivalents of the claims are thus intended to be embraced by the scope of the disclosure. Different technical features in different embodiments may be combined to obtain beneficial effects. Other variations of the described embodiments can be understood and practiced by those skilled in the art upon studying the drawings, the specification and the claims herein.

What is claimed is:

1. A cap assembly for a secondary battery, comprising a cap plate, an electrode terminal, a fixing member, a sealing member and a connecting member, wherein:
   the cap plate has an electrode lead-out hole;
   the fixing member is fixed to the connecting member by having a main portion of the connecting member inserted into an opening of the fixing member, and the connecting member is in contact with the cap plate via welding, so that the fixing member is pressed against the cap plate by the connecting member;
   the electrode terminal includes a terminal board, wherein a part of the fixing member is located on a top side of the terminal board away from the cap plate to limit a position of the terminal board relative to the cap plate, and a part of the connecting member is located on the top side of the terminal board, the electrode terminal is isolated from the connecting member by the fixing member, the terminal board is located at a side of the cap plate and covers the electrode lead-out hole, and an outer peripheral surface of the terminal board protrudes out of an inner wall of the electrode lead-out hole; and
   the sealing member is disposed between the terminal board and the cap plate to seal the electrode lead-out hole,
   wherein the electrode terminal is fastened to the cap plate by a connection of the connecting member with the fixing member and the cap plate.

2. The cap assembly of claim 1, wherein the fixing member is a hard plastic member, and a part of the fixing member is located between the cap plate and the terminal board.

3. The cap assembly of claim 1, wherein the sealing member comprises a body portion and an extension portion, wherein the body portion is disposed between the terminal board and the cap plate, and the extension portion is connected with the body portion and extended into the electrode lead-out hole.

4. The cap assembly of claim 1, wherein the sealing member is made of conductive rubber having a predetermined resistance value, so as to realize electrical connection between the electrode terminal and the cap plate through the sealing member.

5. The cap assembly of claim 1, wherein one of the terminal board and the fixing member is provided with a convex portion, and the other is provided with a concave portion that accommodates the convex portion, and the concave portion and the convex portion are fitted with each other to fix the terminal board to the fixing member.

6. The cap assembly of claim 5, wherein the convex portion is disposed on the outer peripheral surface of the terminal board, the concave portion is disposed on an inner wall of the fixing member adapted to the convex portion, and a surface of the terminal board away from the cap plate protrudes from a surface of the fixing member away from the cap plate.

7. The cap assembly of claim 1, wherein the connecting member comprises a first connecting plate, wherein a part of the first connecting plate is embedded in the fixing member and engaged with the fixing member, and another part of the first connecting plate is welded with the cap plate.

8. The cap assembly of claim 1, wherein the cap assembly further comprises a first insulator, wherein the first insulator comprises an annular body portion that is accommodated in the electrode lead-out hole, and wherein an end face of the body portion close to the electrode terminal protrudes from a surface of the cap plate close to the electrode terminal.

9. The cap assembly of claim 8, wherein the sealing member is in close contact with the terminal board, the fixing member, the cap plate and the first insulator at the same time.

10. The cap assembly of claim 1, wherein the electrode terminal is formed as a plate-like structure, and the electrode terminal does not extend into the electrode lead-out hole.

11. A secondary battery, comprising:
   a shell having an opening;
   an electrode assembly accommodated in the shell; and the cap assembly of claim 1, wherein the cap assembly covers the opening to enclose the electrode assembly in the shell, and the terminal board is completely located outside the shell.

\* \* \* \* \*